United States Patent [19]

Sundberg

[11] Patent Number: 4,925,352
[45] Date of Patent: May 15, 1990

[54] SHEET NAILS IN STRIPS

[75] Inventor: Ingvar Sundberg, Huddinge, Sweden

[73] Assignee: Nordisk Kartro AB, Farsta, Sweden

[21] Appl. No.: 53,829

[22] PCT Filed: Sep. 8, 1986

[86] PCT No.: PCT/SE86/00395

§ 371 Date: May 14, 1987

§ 102(e) Date: May 14, 1987

[87] PCT Pub. No.: WO87/02105

PCT Pub. Date: Apr. 9, 1987

[30] Foreign Application Priority Data

Oct. 2, 1985 [SE] Sweden ................. 8504557

[51] Int. Cl.⁵ ............................. F16B 15/08
[52] U.S. Cl. .................. 411/443; 411/464; 411/478
[58] Field of Search ........ 411/443, 442, 444, 462–464, 411/477–478, 452, 456, 485, 488, 493

[56] References Cited

U.S. PATENT DOCUMENTS

| 1,465,783 | 8/1923 | Polzer . | |
| 2,033,613 | 3/1936 | Crosby | 411/442 X |
| 2,235,300 | 3/1941 | Ramey | 411/464 X |
| 2,314,481 | 3/1943 | Crooks | 411/485 X |
| 2,651,232 | 9/1953 | Lang | 411/442 X |
| 3,072,008 | 1/1963 | Lang . | |
| 4,167,885 | 9/1979 | Paskert et al. | 411/478 |

FOREIGN PATENT DOCUMENTS

| 920221 | 11/1954 | Fed. Rep. of Germany . | |
| 2537460 | 2/1977 | Fed. Rep. of Germany . | |
| 1201689 | 1/1960 | France . | |
| 2447481 | 8/1980 | France . | |
| 64391 | 9/1922 | Sweden . | |
| 67693 | 11/1926 | Sweden . | |
| 145629 | 6/1954 | Sweden | 411/444 |
| 407443 | 3/1979 | Sweden . | |
| 415917 | 11/1980 | Sweden . | |
| 366425 | 2/1963 | Switzerland . | |
| 899004 | 6/1962 | United Kingdom | 411/444 |
| 915952 | 1/1963 | United Kingdom . | |
| 2002868 | 2/1979 | United Kingdom . | |

Primary Examiner—Neill R. Wilson
Assistant Examiner—Jerry Redman
Attorney, Agent, or Firm—Young & Thompson

[57] ABSTRACT

Sheet metal nails (2) are linked side-by-side with each other in a metal strip (1), the nails being parallel to each other and extending at an angle to the longitudinal direction of the strip from one lateral edge of the strip to the other opposite lateral edge. Each sheet nail (2) has a profiled nail shank (4) having at one end a head (5), a transition portion between the profiled shank (4) and the nail head (5) comprising a relatively gently curved portion (7) which is also profiled, the head being also profiled and no wider than the shank. The nail end remote from the head has a penetration portion with at least one point. The profiling of the nail shank (4), the curved portion (7) and the head (5) is such that these portions have substantially the same cross-sectional shape, the sheet metal in the nail being of substantially uniform thickness. The nails are joined to each other only by metal bridges that are spaced apart lengthwise of the nails, the nails being separate from each other between the bridges.

1 Claim, 2 Drawing Sheets

SHEET NAILS IN STRIPS

FIELD OF THE INVENTION

The present invention relates to sheet nails linked side-by-side with each other in a metal band or sheet-metal strip, e.g. so-called sheet nails in strips, where the nails are parallel to each other and extend at an angle or perpendicular to the longitudinal direction of the strip from one lateral edge of the strip to the other opposite lateral edge, said sheet nails having a profiled nail shank which is provided at one end with a head.

BACKGROUND OF THE INVENTION

In industrial, mechanized nailing, e.g. the nailing together of pallets with the aid of more or less automated nailing machines or nailing devices, the nails must be supplied to the fastening mechanism of the machine or device from a magazine or be supplied in the form of a feed band to enable the nailing to be effected at the desired high speed and without the risk of breakdown or other work stoppage.

The most reliable method of continuously supplying nails to the nailing machine has proven to be loading the machine with strip nails either in the form of separate nails fixed onto/in a belt or linked sheet nails formed in a sheet-metal strip, which are separated one at a time in the machine from the rest of the strip or belt and are driven into the pieces to be nailed together.

The technique of using still interconnected sheet nails which are rolled or stamped for example in a sheet-metal strip is clearly superior to using nails fixed onto/in a belt since loading the belt with the individual nails is expensive and presents the problem of disposing of waste in the form of empty belts after nailing.

It is true that known types of sheet nails in strips have been able to be manufactured at relatively low cost, but their performance as fasteners has not been satisfactory in all respects.

The strength of these sheet nails has for example often been unsatisfactory, especially in the transition portion between the nail shank and the flat (smooth) head. Furthermore, the known sheet nails in many cases do not provide the desired straight penetration by the nail shank when the nail is driven in. It is also a well known fact that the risk of cracking is relatively great for these known types of sheet nails. The primary purpose of the invention is therefore to achieve a new improved type of sheet nails in strips, which have better strength properties than known sheet nails and also enable the nail to be driven in straight. An additional purpose is to achieve a sheet nail which provides substantially less risk of cracking and splitting during nailing than for previously known sheet nails.

SUMMARY OF THE INVENTION

According to the invention this is achieved by the transitional portion between the profiled shank and the nail head consisting of a bent portion which is also profiled, and by the head being profiled as well and being not wider than the shank, the nail end remote from the head having a penetration portion with at least one edge, cross-cut edge surface or point.

With a sheet nail made in this manner, increased strength is achieved by virtue of the fact that the nails are profiled along their entire length, i.e. not only along the shank but also at the transitional portion and the head. By profiling the head, its surface will be greater than the surface of a corresponding flat head. In addition to increasing the strength in the profiled bent portion and in the laterally extending portion, increased bending stiffness can be achieved in the nail shank since the "profile angle" can be as small or smaller than 90° without making the manufacture of the strip nails more difficult. The improved strength and stiffness along the entire length of the nail due to the high degree of corrugation, make it possible to achieve the desired straight driving in of the nails. Good tensile strength, shear strength and good grip are achieved due to the improved strength of the upper portion of the nail, the greater surface and the profiled shape.

The parallel nails in the strip can be oriented so that they form a right angle or an acute angle to the longitudinal direction of the strip. The end of the nail can be cut straight across and have a penetration portion with a chisel-like edge. Alternatively, the nails can have one, two or more points at the penetration end.

Sheet nails in strips with only one point on each nail require that more concentrated material be removed than if each nail is provided with two or more separate points. A single point-shape also means that the risk of cracking will be greater than with a multi point-shape. According to a preferred embodiment of the nail according to the invention, the penetrating end portion of the nail has a double point comprising a pair of laterally separated single points. The reduced risk of cracking achieved with the multipoint-shape is a result of the fact that the multiple points are better able to distribute the material which is pushed aside, and the multipoint design also facilitates straight driving of the nail, reduces the driving force required and reduces the risk of cracking to a minimum. To simplify manufacture of sheet nails according to the invention as much as possible, to reduce the cost of materials, to reduce nail weight, to reduce the risk of cracking when driving into wood, and to simplify handling of the nails in strips, both when inserted in the nailing machine or device and during the various steps of feeding them into the same, it is an expressed desire that the thickness of the sheet-metal in the strip in which the nails are made be kept as thin as possible. It is possible to use very thin sheet-metal thanks to the fact that the sheet nails are profiled along their entire length. After profiling, the metal in the sheet nails should be approximately of uniform thickness.

The relative placement and shape of the profiled sheet nails in the metal strip is suitable such that the distance between adjacent nails is so small that a following nail can serve as a lateral support for a preceding nail located in the driving position in the nailing machine or device, and that the head has the same width as the shank. The fact that the head has the same width as the shank, and that the nails are closely adjacent to each other are factors which make it possible to utilize the sheet-metal material to a maximum, thus avoiding unnecessary waste. Close spacing between the nails in the strip also makes it possible to feed the nails in the nailing machine or device at higher speed which in turn results in a higher nailing rate. A further advantage of the close spacing between the nails in the strip is that the energy required for stepwise advancing of the strip is not as great as when using strip nails with greater spacing between the nails. The close spacing between the nails also results in reduced material use as compared with the larger spacing. The individual adjacent sheet nails in the strip are connected to each other by at least one "connecting bridge", but they can of course have two or more such connecting bridges between their adjacent sides.

BRIEF DESCRIPTION OF THE DRAWINGS

The invention will now be described in more detail below with reference to examples shown in the accompanying drawing, in which.

DETAILED DESCRIPTION OF THE INVENTION

Figure 1:
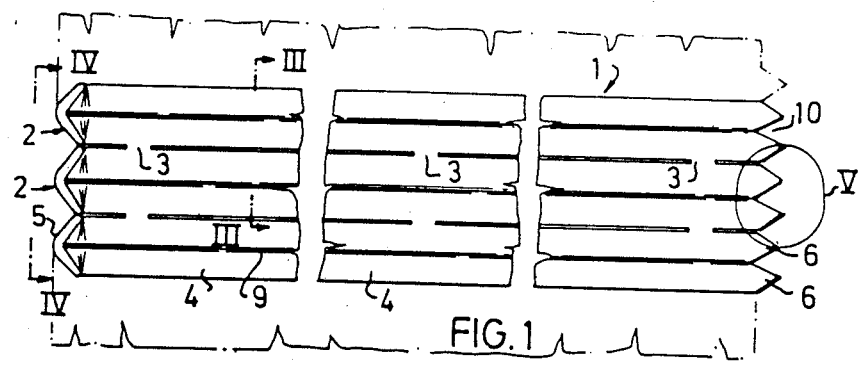
FIG. 1 shows a portion of a sheet-metal strip consisting of connected sheet nails, the metal strip being shown in plane projection.
Figure 2:
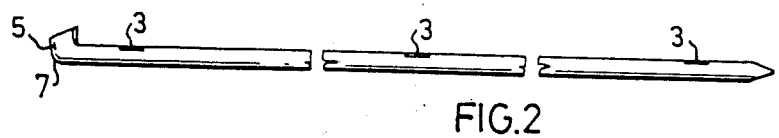
FIG. 2 shows a side-view of a sheet nail in such a metal strip.

FIG. 1 shows a portion of a sheet-metal strip 1 consisting of a plurality of sheet nails 2 connected side-by-side to each other. The nails 2 are thus parallel to each other and extend transversely to the longitudinal direction of the strip 1. In the case shown, the sheet nails in the strip are connected to each other via three connecting bridges 3 along each longitudinal edge of each nail 2. Each nail has a profiled shank 4 which is provided at one end with a head 5 extending to one side of the nail, and at its opposite end with a point portion consisting of a pair of points 6 disposed side-by-side.

The profiled shank 4 is connected to the head 5 via a relatively gently bent transition portion 7 which is also profiled. The head 5 is also profiled as is the shank 4 and the transition portion 7, and the three parts have preferably approximately the same cross-sectional shape. Furthermore, the thickness of the sheet-metal is approximately uniform and thus the same in the shank, the transition portion and the head. In practice a sheet-metal thickness of not more than say 1.5 mm would be suitable. The sheet nail thus consists of thin sheet-metal stiffened by providing a uniform profiled cross-section which extends along the shank, bent transition portion and head.

Figure 3:
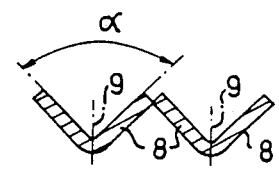
FIG. 3 shows a cross section of two connected sheet nails along the line III—III in FIG. 1.
Figure 4:
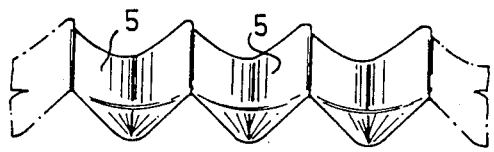
FIG. 4 shows an end view of the heads of several of the adjacent sheet nails in the metal strip shown in FIG. 1, as seen in the longitudinal direction of the nails.

The parts 4, 7 and 5 of the sheet nail 2 are intended in the embodiment shown to have approximately the same cross-sectional shape, as is best seen in FIGS. 1 and 3. It is, however, not necessary that the three sections of the nail have the same cross-sectional shape, but a similar profile of the parts facilitates manufacture of the nails. FIGS. 1 and 3, respectively, show a nail head 5 and a nail shank 4, respectively, both having a cross section in the shape of a V. Other conceivable cross-sectional shapes, particularly for the nail shank, are U-shapes and C-shapes.

As is best seen in FIGS. 1 and 3, the shank 4 has a pair of identical flank portions 8 connected to each other at the longitudinal centre line 9 of the shank. The shank 4 in the embodiment shown thus presents a V-shaped trough, the sides of which are made by flank portions 8 of equal width. Between the laterally spaced points 6 there is a V-shaped notch 10 the point of which is located at the centre line 9.

The angle between the two flank portions 8 of the nail shank 4 should in general fall within the interval 60°–120°, and in practice a V-angle of approximately 90° has proved suitable both as regards manufacturing and as regards the strength and gripping power of the nail.

Figure 5:
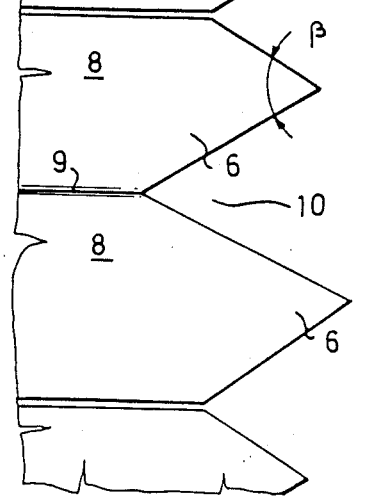
FIG. 5 shows on a larger scale and in plane projection the point end of a sheet nail with its two laterally separated points.

The two points 6 of the nail have a V-shape in the plane of the respective flank portions 8 which when viewed in the plane of the strip 1 (see FIG. 5) has a projected point angle $\beta$ in the interval 40°–110°. In practice the points 6 should have projected point angles in the plane of the strip 1 lying in the interval 60°–90°. In certain cases it can be suitable that the points 6 have approximately the same point angle as the notch 10 between the points.

Even though the embodiment shown in FIGS. 1–5 requires that the sheet nail have two laterally spaced points 6, it is also conceivable to have embodiments with more than two points, for example three points. The third point is then suitably placed in the notch 10 between a pair of outer points 6.

Figure 6:
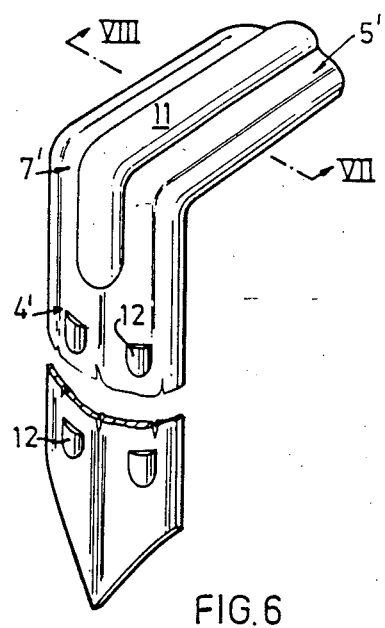
FIGS. 6–8 show in perspective, cross section and in partial side-view an alternative embodiment with a superimposed extra reinforcing profile in the head, the transitional portion and a small portion of the shank.
Figure 7:
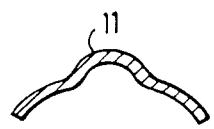
Figure 8:
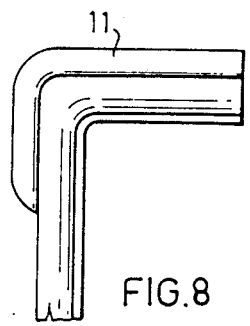

FIGS. 6–8 show a single point embodiment of a nail with a profiled head 5' and transition portion 7' which are arcuate in cross section and a nail shank 4' extending from the transition portion 7' with the same profile. Both the nail head and the transition portion and the portion of the nail shank adjacent thereto have an additional superimposed arcuate profile 11. This additional profile forms a continuous back or ridge on the convex outside of the head, the transition portion and said portion of the shank. This ridge on these three parts enables the entire nail to resist bending and buckling when the nail is driven into the material. In order to increase the grip of the nail, the shank can be provided with a number of small projections, in the form of jags 12 for example. Such jags or corresponding means can of course be placed on the shank in all the other conceivable embodiments of the invention, e.g. in the embodiment shown in FIGS. 1–5.

As regards the orientation of the nails which are parallel to each other along the strip, it should be noted that these do not need to be perpendicular to the longitudinal direction of the strip, as shown in FIGS. 1–5.

Figure 9:
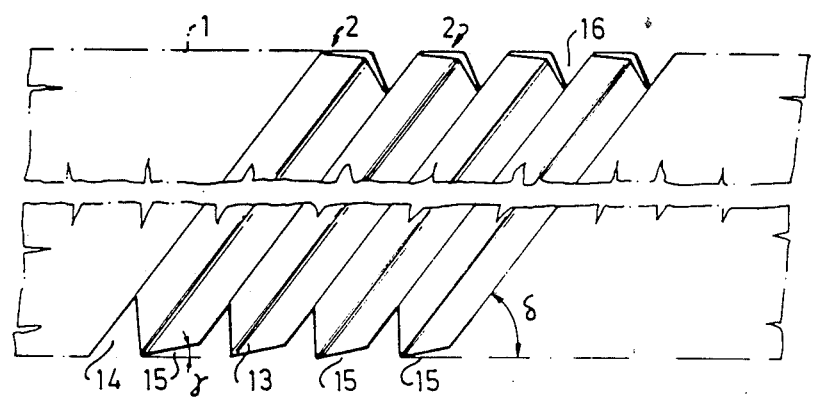
FIG. 9 shows schematically a nail strip in which the nails are slanted across the strip.

FIG. 9 shows an embodiment in which the nails 2 in the strip 1 are arranged slanted across the strip, at a suitable acute angle $\delta$ to the longitudinal direction of the strip. The nails shown in FIG. 9 have a single point 13 and a profile shape similar to that shown in FIGS. 1–5. In this type of slanted nails, the portions 14, 15 and 16 must of course be removed from the strip when the nails are made in the strip. By selecting the proper angle of incline $\delta$, it is possible to achieve an angle $\delta$ which is 0°, thus making it unnecessary to remove any portion 15.

Even though the invention has been described above primarily with reference to the presently preferred embodiment shown in the drawing, it is of course quite possible that the sheet nails according to the present invention can be given other conceivable embodiments within the scope of the following patent claims.

I claim:

1. Sheet metal nails (2) linked side-by-side with each other in a metal strip (1), the nails being parallel to each other and extending at an angle to the longitudinal direction of the strip from one lateral edge of the strip to the other opposite lateral edge thereof, each sheet nail (2) having a profiled nail shank (4) having at one end a head (5), the nail end remote from the head having a penetration portion with at least one point, a transitional portion between the profiled shank (4) and the nail head (5'), wherein the transitional portion is a relatively gently curved portion (7') with a non-linear transverse cross-sectional profile, the head having also a non-linear transverse cross-sectional profile and being no wider than the shank, the profiling of the nail shank (4'), the curved portion (7') and the head (5') being such that these portions have substantially the same non-linear cross-sectional profile shape, the sheet metal in the nail being of substantially uniform thickness, and wherein at least the nail head (5') and said curved portion (7') have a longitudinal midportion in the form of a superimposed arcuate profile (11') whose cross section is arcuate, and portions on opposite sides of said midportion whose cross section is also arcuate but of a radius of curvature greater than the radius of curvature of said cross section of said longitudinal midportion.

* * * * *